United States Patent
Yu et al.

(10) Patent No.: US 10,257,657 B2
(45) Date of Patent: Apr. 9, 2019

(54) TRIGGERING TRANSMISSIONS USING LOCATION INFORMATION

(71) Applicant: Lenovo Innovations Limited (Hong Kong), Hong Kong (CN)

(72) Inventors: Xiaodong Yu, Beijing (CN); Haipeng Lei, Beijing (CN); Zukang Shen, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

(21) Appl. No.: 15/476,411

(22) Filed: Mar. 31, 2017

(65) Prior Publication Data

US 2017/0289767 A1 Oct. 5, 2017

(30) Foreign Application Priority Data

Mar. 31, 2016 (WO) ................ PCT/CN2016/078215

(51) Int. Cl.
*H04W 4/02* (2018.01)
*H04W 4/029* (2018.01)
*H04L 5/00* (2006.01)
*H04W 4/04* (2009.01)

(52) U.S. Cl.
CPC .......... *H04W 4/029* (2018.02); *H04L 5/0051* (2013.01); *H04W 4/046* (2013.01)

(58) Field of Classification Search
CPC ....... H04W 4/028; H04W 4/02; H04W 4/046; H04W 4/04; H04L 5/0051; H04L 5/00
See application file for complete search history.

(56) References Cited

U.S. PATENT DOCUMENTS

| 2007/0026871 | A1* | 2/2007 | Wager | H04W 4/02 455/456.1 |
| 2012/0309376 | A1* | 12/2012 | Huang | H04M 1/72572 455/418 |
| 2015/0312960 | A1* | 10/2015 | Kim | H04W 72/04 370/329 |
| 2016/0242005 | A1* | 8/2016 | Chen | H04W 4/025 |
| 2017/0048036 | A1* | 2/2017 | Tavildar | H04L 1/0025 |

FOREIGN PATENT DOCUMENTS

| CN | 102275565 A | 12/2011 |
| CN | 105101250 A | 11/2015 |
| WO | 2015/032436 A1 | 3/2015 |
| WO | 2015/168940 A1 | 11/2015 |
| WO | 2016159715 A1 | 10/2016 |

OTHER PUBLICATIONS

PCT/CN2016/078215 International Search Report and Written Opinion, dated Dec. 27, 2016, pp. 1-13.
LG Electronics, "Discussion on enhancement of PC5 based V2V resource allocation", 3GPP TSG RAN WG1 Meeting #83 R1-157435, Nov. 15-22, 2015, pp. 1-18.

* cited by examiner

*Primary Examiner* — Frantz Bataille
(74) *Attorney, Agent, or Firm* — Kunzler, PC

(57) ABSTRACT

Apparatuses, methods, and systems are disclosed for triggering transmissions using a location. One apparatus includes a processor that determines reference location information. The processor also determines current location information. The processor determines whether a trigger is satisfied using the reference location information and the current location information. The apparatus also includes a transmitter that transmits the current location information in response to the trigger being satisfied.

48 Claims, 10 Drawing Sheets

TRIGGERING TRANSMISSIONS USING LOCATION INFORMATION

FIELD

The subject matter disclosed herein relates generally to wireless communications and more particularly relates to triggering transmissions using location information.

BACKGROUND

The following abbreviations are herewith defined, at least some of which are referred to within the following description.
    3GPP Third Generation Partnership Project
    ACK Positive-Acknowledgment
    ANDSF Access Network Discovery and Selection Function
    AP Access Point
    APN Access Point Name
    BLER Block Error Ratio
    BPSK Binary Phase Shift Keying
    CAZAC Constant Amplitude Zero Auto Correction
    CCA Clear Channel Assessment
    CCE Control Channel Element
    CP Cyclic Prefix
    CQI Channel Quality Indicator
    CSI Channel State Information
    CSS Common Search Space
    D2D Device-to-Device
    DCI Downlink Control Information
    DL Downlink
    DMRS Demodulation Reference Signal
    eNB Evolved Node B
    EPDCCH Enhanced Physical Downlink Control Channel
    E-RAB E-UTRAN Radio Access Bearer
    ETSI European Telecommunications Standards Institute
    E-UTRAN Evolved Universal Terrestrial Radio Access Network
    FBE Frame Based Equipment
    FDD Frequency Division Duplex
    FDM Frequency Division Multiplexing
    FDMA Frequency Division Multiple Access
    FEC Forward Error Correction
    GPRS General Packet Radio Service
    GPT GPRS Tunneling Protocol
    HARQ Hybrid Automatic Repeat Request
    H-PLMN Home Public Land Mobile Network
    IP Internet Protocol
    ISRP Inter-System Routing Policy
    LAA Licensed Assisted Access
    LBE Load Based Equipment
    LBT Listen-Before-Talk
    LTE Long Term Evolution
    MCL Minimum Coupling Loss
    MCS Modulation and Coding Scheme
    MME Mobility Management Entity
    MU-MIMO Multi-User, Multiple-Input, Multiple-Output
    NACK or NAK Negative-Acknowledgment
    NAS Non-Access Stratum
    NBIFOM Network-Based IP Flow Mobility
    OFDM Orthogonal Frequency Division Multiplexing
    PCell Primary Cell
    PBCH Physical Broadcast Channel
    PCO Protocol Configuration Options
    PCRF Policy and Charging Rules Function
    PDCCH Physical Downlink Control Channel
    PDCP Packet Data Convergence Protocol
    PDN Packet Data Network
    PDSCH Physical Downlink Shared Channel
    PDU Protocol Data Unit
    PGW Packet Data Network Gateway
    PHICH Physical Hybrid ARQ Indicator Channel
    PLMN Public Land Mobile Network
    PMI Precoding Matrix Indicator
    PRACH Physical Random Access Channel
    PRB Physical Resource Block
    PTI Procedure Transaction Identity
    PUCCH Physical Uplink Control Channel
    PUSCH Physical Uplink Shared Channel
    QoS Quality of Service
    QPSK Quadrature Phase Shift Keying
    RAB Radio Access Bearer
    RAN Radio Access Network
    RAR Random Access Response
    RE Resource Element
    RI Rank Indicator
    RRC Radio Resource Control
    RX Receive
    SA Scheduling Assignment
    SC-FDMA Single Carrier Frequency Division Multiple Access
    SCell Secondary Cell
    SCH Shared Channel
    SGW Serving Gateway
    SIB System Information Block
    SINR Signal-to-Interference-Plus-Noise Ratio
    SR Scheduling Request
    TAU Tracking Area Update
    TB Transport Block
    TBS Transport Block Size
    TCP Transmission Control Protocol
    TDD Time-Division Duplex
    TDM Time Division Multiplex
    TEID Tunnel Endpoint Identification ("ID")
    TRU Transmission Resource Unit
    TX Transmit
    UCI Uplink Control Information
    UE User Entity/Equipment (Mobile Terminal)
    UL Uplink
    UMTS Universal Mobile Telecommunications System
    V2I Vehicle-to-Infrastructure
    V2N Vehicle-to-Network
    V2P Vehicle-to-Pedestrian
    V2X Vehicle-to-X
    V2V Vehicle-to-Vehicle
    V-PLMN Visited Public Land Mobile Network
    WiMAX Worldwide Interoperability for Microwave Access
    WLAN Wireless Local Area Network In wireless communications networks, V2X transmission and reception may be used. Resource allocation for V2X may be performed by eNB scheduling and/or by UE autonomous selection. eNB scheduling may work for in-network coverage scenarios in which the eNB can schedule the resource for served UEs taking into account various latency requirements of different services between the eNB and the UEs. UE autonomous resource selection may work for out-of-network coverage and may work for in-network coverage. In certain configurations, a UE may autonomously select a needed resource from a preconfigured resource pool with an equal probability for using each resource without a resource collision. As may be appreciated, eNB scheduling may be preferred in certain configurations because eNB scheduling may avoid possible resource collision that can happen in UE autonomous resource selection. In contrast, UE autonomous resource selection may be preferred in certain configurations because UE autonomous resource selection may save signaling overhead and work for out-of-network coverage.

In one configuration, geographical information (e.g., one or more of a geographical location, a velocity, and a moving direction) may be used by a UE and/or an eNB for resource allocation and/or reporting. In certain configurations, geographical information may be used for sidelink resource allocation. In various configurations, geographical information may be used by a UE for autonomous resource selection. Transmitting geographical information frequently may use a large amount of radio resources of a UE interface.

BRIEF SUMMARY

Apparatuses for triggering transmissions using location information are disclosed. Methods and systems also perform the functions of the apparatus. In one embodiment, an apparatus includes a processor that determines reference location information. The processor also determines current location information. The processor determines whether a trigger is satisfied using the reference location information and the current location information. The apparatus also includes a transmitter that transmits the current location information in response to the trigger being satisfied.

In certain embodiments, the reference location information is determined using a single reference location, and the current location information is determined using a current location. In some embodiments, the single reference location is a last transmitted location, and the trigger is satisfied in response to a distance between the single reference location and the current location being greater than a predetermined threshold. In certain embodiments, the apparatus includes a receiver that receives information indicating the single reference location. In various embodiments, the trigger is satisfied in response to a distance between the single reference location and the current location being greater than a predetermined threshold, and a distance between the single reference location and a last transmitted location being less than the predetermined threshold.

In various embodiments, the reference location information includes a reference region determined using multiple reference locations, and the current location information is determined using a current location. In one embodiment, the reference region is a concave hull or a convex hull determined using the multiple reference locations. In another embodiment, the apparatus includes a receiver that receives information indicating the multiple reference locations.

In certain embodiments, the trigger is satisfied in response to the current location being outside of the reference region, and a last transmitted location being within the reference region. In various embodiments, the apparatus includes a receiver that receives information indicating one or more resource pools corresponding to the current location information. In such embodiments, the processor determines a resource pool from the one or more resource pools, and the transmitter transmits data using the determined resource pool. In some embodiments, the apparatus includes a receiver that receives information indicating a DMRS density, and the transmitter transmits data using the DMRS density. In one embodiment, the reference location information is determined using a last transmitted location.

One method for triggering transmissions using location information includes determining reference location information. The method includes determining current location information. The method also includes determining whether a trigger is satisfied using the reference location information and the current location information. The method includes transmitting the current location information in response to the trigger being satisfied.

Another apparatus for triggering transmissions using location information includes a processor that determines reference location information. The apparatus also includes a receiver that receives current location information from a device in response to a trigger being satisfied using the reference location information and the current location information.

In certain embodiments, the reference location information is determined using a single reference location, and the current location information is determined using a current location. In some embodiments, the single reference location is a last received location, and the trigger is satisfied in response to a distance between the single reference location and the current location of the device being greater than a predetermined threshold. In certain embodiments, the apparatus includes a transmitter that transmits information indicating the single reference location. In various embodiments, the trigger is satisfied in response to a distance between the single reference location and the current location being greater than a predetermined threshold, and a distance between the single reference location and a last received location from the device being less than the predetermined threshold.

In various embodiments, the reference location information includes a reference region determined using multiple reference locations, and the current location information is determined using a current location. In one embodiment, the reference region is a concave hull or a convex hull determined using the multiple reference locations. In another embodiment, the apparatus includes a transmitter that transmits information indicating the multiple reference locations.

In certain embodiments, the trigger is satisfied in response to the current location of the device being outside of the reference region, and a last received location from the device being within the reference region. In various embodiments, the apparatus includes a transmitter, and: the processor determines one or more resource pools for the device to use, the one or more resource pools corresponding to the current location information of the device; and the transmitter transmits information indicating the one or more resource pools to the device. In some embodiments, the apparatus includes a transmitter, and: the processor determines a DMRS density for the device to use based on the currently location information of the device; and the transmitter transmits information indicating the DMRS density to the device. In one embodiment, the reference location information is determined using a last received location.

Another method for triggering transmissions using location information includes determining reference location information. The method includes receiving current location information from a device in response to a trigger being satisfied using the reference location information and the current location information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
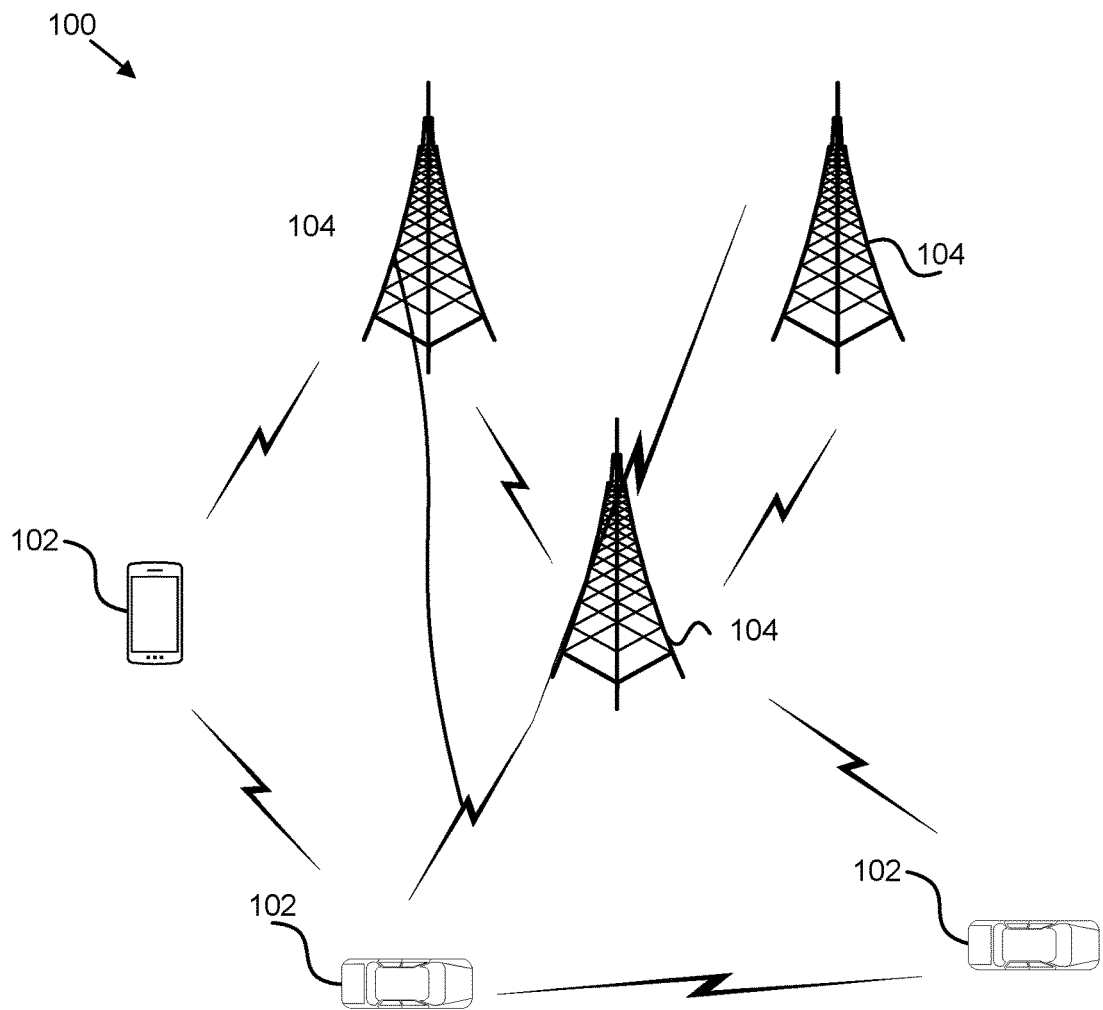
FIG. 1 is a schematic block diagram illustrating one embodiment of a wireless communication system for triggering transmissions using location information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for triggering transmissions using location information. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, a vehicle, a vehicle unit, or by other terminology used in the art. The remote units 102 may communicate directly with one or more of the base units 104 via UL communication signals. Moreover, reach remote unit 102 may communicate directly with one or more of the other remote units 102 (e.g., using sidelink signals, V2V communication, D2D communication, etc.).

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, an apparatus (e.g., UE, vehicle, remote unit 102) may determine reference location information. The reference location information may correspond to a reference location (or reference region) that may be any type of region that covers a defined area. The reference location may be defined as encompassing an area within a distance from an origin, encompassing an area within a distance from a location or coordinate, encompassing an area within defined boundaries, and so forth. As used herein, coordinate may refer to any information useful to define a location. For example, a coordinate may be a latitude and longitude pair used to define a location. The apparatus may determine current location information. The current location information may include any information useful to determine a location of a device, such as a street address, a latitude, a longitude, and/or an altitude, and so forth. Moreover, the apparatus may determine whether a trigger is satisfied using the reference location information and the current location information. The apparatus may transmit the current location information in response to the trigger being satisfied. Accordingly, the apparatus may transmit the current location information with limited frequency upon satisfying the trigger, thereby limiting the amount of resources used to transmit the current location information.

In another embodiment, an apparatus (e.g., eNB, base unit 104) may determine reference location information. Moreover, the apparatus may receive current location information from a device (e.g., remote unit 102) in response to a trigger being satisfied using the reference location information and the current location information.

Figure 2:
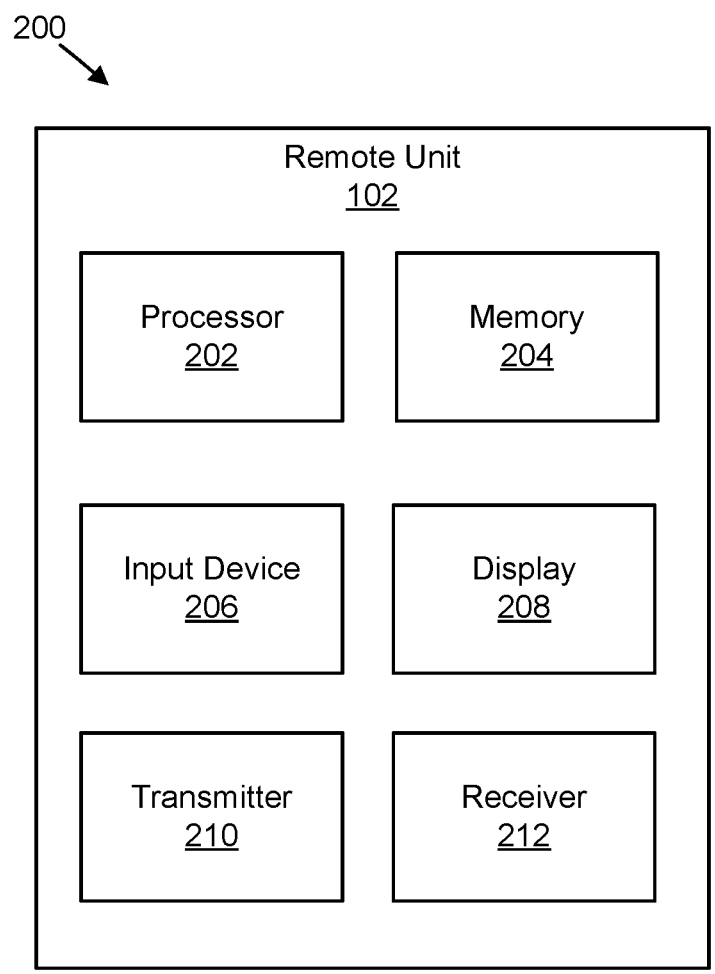
FIG. 2 is a schematic block diagram illustrating one embodiment of an apparatus that may be used for triggering transmissions using location information.

FIG. 2 depicts one embodiment of an apparatus 200 that may be used for triggering transmissions using location information. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine reference location information. In some embodiments, the processor 202 may determine current location information. In various embodiments, the processor 202 may determine whether a trigger is satisfied using the reference location information and the current location information.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to information to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and/or sidelink signals to other remote units 102. The receiver 212 is used to receive DL communication signals from the base unit 104 and/or sidelink communication signals from other remote units 102. In one embodiment, the transmitter 210 is used to transmit the current location information to a base unit 104 in response to the trigger being satisfied. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
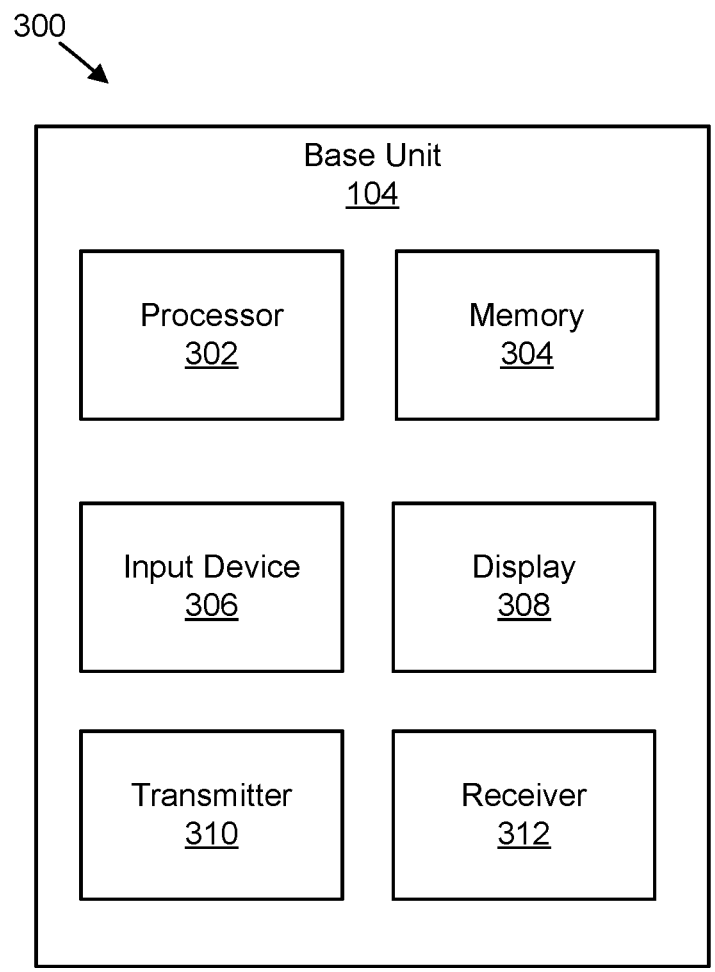
FIG. 3 is a schematic block diagram illustrating another embodiment of an apparatus that may be used for triggering transmissions using location information.

FIG. 3 depicts another embodiment of an apparatus 300 that may be used for triggering transmissions using location information. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively.

In one embodiment, the processor 302 may determine reference location information. The transmitter 310 is used to provide DL communication signals to the remote unit 102 and the receiver 312 is used to receive UL communication signals from the remote unit 102. In certain embodiments, the receiver 312 is used to receive current location information from a device (e.g., the remote unit 102) in response to a trigger being satisfied using the reference location information and the current location information.

In certain embodiments, a base unit 104 may transmit and a remote unit 102 may receive various configuration information that may be used for determining resources to use and/or for determining when to change resources used. For example, a base unit 104 may transmit one or more of the following to a remote unit 102: a location based resource pool, a DMRS configuration, a moving distance threshold, one or more reference point coordinates, and a region specific resource pool. The various configuration information is described in FIGS. 4 through 8.

Figure 4:
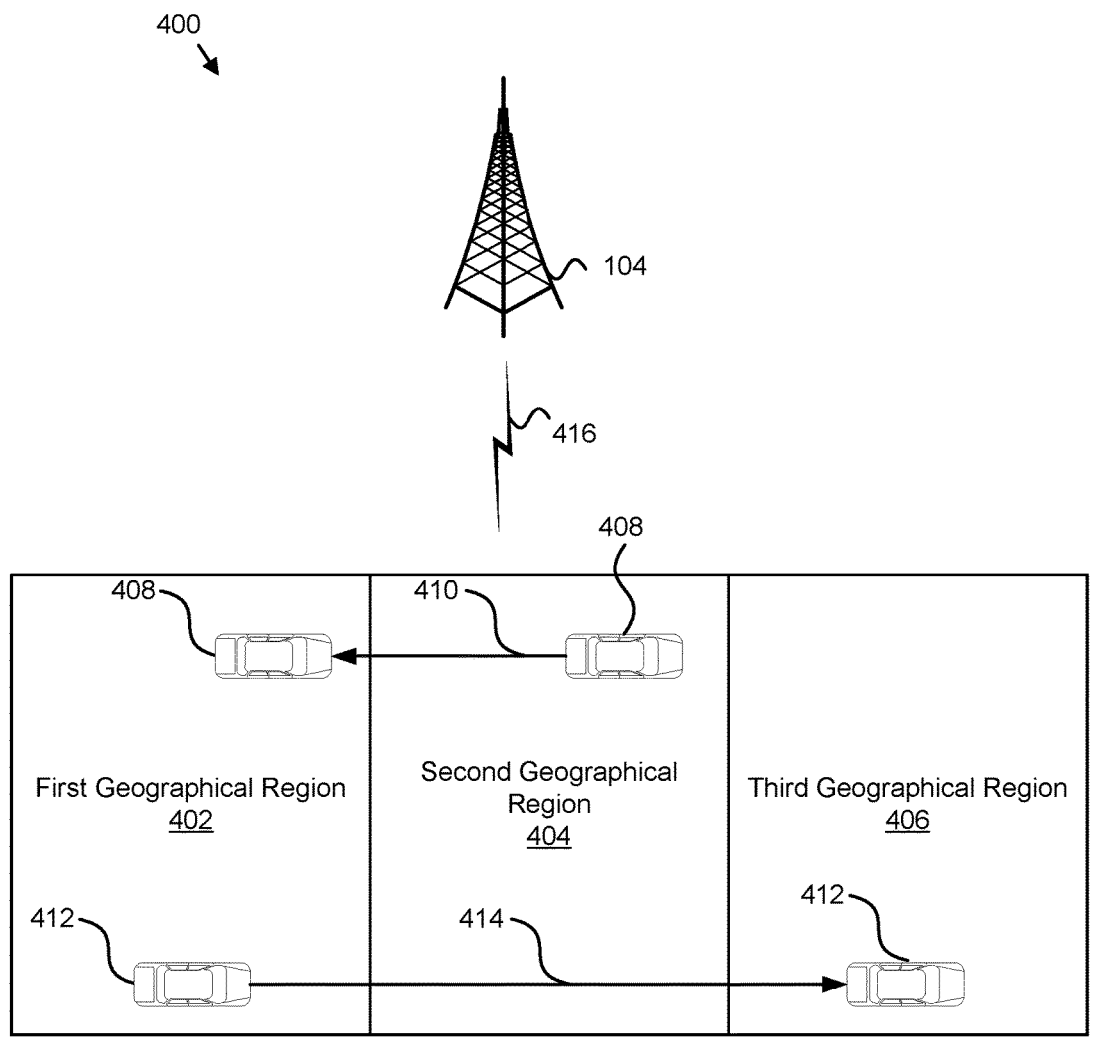
FIG. 4 is a schematic block diagram illustrating one embodiment of a wireless communication system including location based resource pools.

Specifically, FIG. 4 is a schematic block diagram illustrating one embodiment of a wireless communication system 400 including location resource pools. The wireless communication system 400 includes a first geographical region 402, a second geographical region 404, and a third geographical region 406. The wireless communication system 400 also includes a base unit 104 and a first vehicle unit 408 (e.g., remote unit 102, vehicle UE). The first vehicle unit 408 is illustrated as beginning in the second geographical region 404 at a first time and moving a distance 410 into the first geographical region 402 to be in the first geographical region 402 at a second time. The wireless communication system 400 also includes a second vehicle unit 412 (e.g., remote unit 102, vehicle UE) that begins in the first geographical region 406 at the first time and moves a distance 414 into the third geographical region 406 to be in the third geographical region 406 at the second time. As illustrated, the base unit 104 communicates via a communication channel 416 with the first vehicle unit 408 and the second vehicle unit 412.

In certain embodiments, the base unit 104 may transmit information to the first vehicle unit 408 and/or the second vehicle unit 412 that includes a location-based resource pool (e.g., a resource pool that depends on the location of the vehicle UE). The resource pool may be configured for V2V and/or V2X communication. In various embodiments, if the first vehicle unit 408 and/or the second vehicle unit 412 moves into a geographical region, the first vehicle unit 408 and/or the second vehicle unit 412 may be assigned a region specific resource pool for V2V and/or V2X communication by the base unit 104. In some embodiments, if the first vehicle unit 408 and/or the second vehicle unit 412 moves into a geographical region, the first vehicle unit 408 and/or the second vehicle unit 412 may autonomously select a region specific resource pool for V2V and/or V2X communication. In certain embodiments, if the first vehicle unit 408 and/or the second vehicle unit 412 moves out of one geographical region and into a different geographical region, the first vehicle unit 408 and/or the second vehicle unit 412 may be assigned a different region specific resource pool for V2V and/or V2X communication by the base unit 104. In some embodiments, if the first vehicle unit 408 and/or the second vehicle unit 412 moves out of one geographical region into a different geographical region, the first vehicle unit 408 and/or the second vehicle unit 412 may autonomously select a different region specific resource pool for V2V and/or V2X communication.

For example, in an embodiment in which the base unit 104 assigns resource pools, a resource pool corresponding to the second geographical region 404 may be assigned by the base unit 104 to the first vehicle unit 408 at the first time while the first vehicle unit 408 is in the second geographical region 404. Then, after the first vehicle unit 408 moves the distance 410 into the first geographical region 402, a resource pool corresponding to the first geographical region 402 may be assigned by the base unit 104 to the first vehicle unit 408 at the second time while the first vehicle unit 408 is in the first geographical region 402. As another example, in an embodiment in which the first vehicle unit 408 autonomously selects its resource pools, a resource pool corresponding to the second geographical region 404 may be autonomously selected by the first vehicle unit 408 at the first time while the first vehicle unit 408 is in the second geographical region 404. Then, after the first vehicle unit 408 moves the distance 410 into the first geographical region 402, a resource pool corresponding to the first geographical region 402 may be autonomously selected by the first vehicle unit 408 at the second time while the first vehicle unit 408 is in the first geographical region 402.

As a further example, in an embodiment in which the base unit 104 assigns resource pools, a resource pool corresponding to the first geographical region 402 may be assigned by the base unit 104 to the second vehicle unit 412 at the first time while the second vehicle unit 412 is in the first geographical region 402. Then, after the second vehicle unit 412 moves the distance 414 into the third geographical region 406, a resource pool corresponding to the third geographical region 406 may be assigned by the base unit 104 to the second vehicle unit 412 at the second time while the second vehicle unit 412 is in the third geographical region 406. As another example, in an embodiment in which the second vehicle unit 412 autonomously selects its resource pools, a resource pool corresponding to the first geographical region 402 may be autonomously selected by the second vehicle unit 412 at the first time while the second vehicle unit 412 is in the first geographical region 402. Then, after the second vehicle unit 412 moves the distance 414 into the third geographical region 406, a resource pool corresponding to the third geographical region 406 may be autonomously selected by the second vehicle unit 412 at the second time while the second vehicle unit 412 is in the third geographical region 406.

In some embodiments, the base unit 104 may provide information to the first vehicle unit 408 and/or the second vehicle unit 412 corresponding to a DMRS density to use for communication with other vehicle units using location information from the first vehicle unit 408 and/or the second vehicle unit 412. In certain embodiments, the DMRS density may correspond to a resource pool for a specific region. In various embodiments, the DMRS density may include 1, 2, or 3 symbols per slot (i.e., 2, 4, or 6 symbols per 1 ms subframe). In certain embodiments that include 2 DMRS symbols per 1 ms subframe, the DMRS location may be in symbols 3 and 10 (counting from 0) in a 1 ms subframe that includes 14 total symbols (numbered 0 to 13).

The following examples may have normal CP with 15 kHz subcarrier spacing and may be used for PSCCH and/or PSSCH for V2V communication. In various embodiments that include 4 DMRS symbols per 1 ms subframe, the DMRS location may be in symbols 2, 5, 8, and 11 (counting from 0) in a 1 ms subframe that includes 14 total symbols (numbered 0 to 13).

Such an embodiment may be used with regular spacing. In another embodiment that includes 4 DMRS symbols per 1 ms subframe, the DMRS location may be in symbols 1, 5, 8, and 12 (counting from 0) in a 1 ms subframe that includes 14 total symbols (numbered 0 to 13). Such an embodiment may reuse the RS location of PUCCH format 2. In a further embodiment that includes 4 DMRS symbols per 1 ms subframe, the DMRS location may be in symbols 2, 4, 9, and 11 (counting from 0) in a 1 ms subframe that includes 14 total symbols (numbered 0 to 13). Such an embodiment may have a frequency offset estimation first using symbols 2 and 4, and using symbols 9 and 11. In yet another embodiment that includes 4 DMRS symbols per 1 ms subframe, the DMRS location may be in symbols 3, 6, 7, and 10 (counting from 0) in a 1 ms subframe that includes 14 total symbols (numbered 0 to 13). Such an embodiment may have a frequency offset estimation first using symbols 6 and 7.

In some embodiments, the base unit 104 may provide an indicator to the first vehicle unit 408 and/or the second vehicle unit 412 corresponding to a DMRS density. In one embodiment, the indictor may be 1 bit (e.g., "0" represents 2 columns of DMRS per PRB pair, "1" represents 4 columns of DMRS per PRB pair). In another embodiment, the indicator may be 2 bits (e.g., "01" represents 2 columns of DMRS per PRB pair, "10" represents 3 columns of DMRS per PRB pair, "11" represents 4 columns of DMRS per PRB pair, and "00" may be reserved for another condition, such as to represents 6 columns of DMRS per PRB pair).

Figure 5:
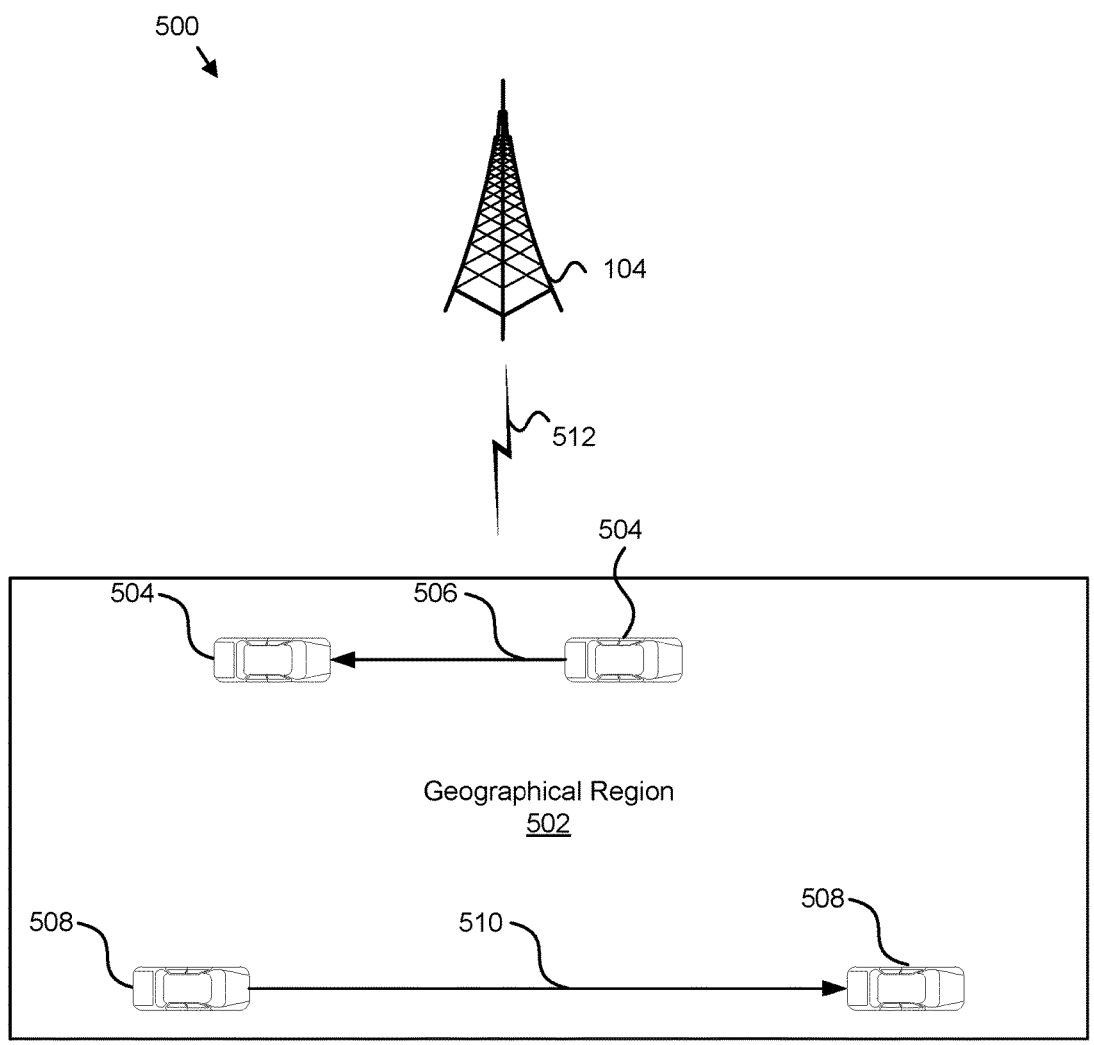
FIG. 5 is a schematic block diagram illustrating one embodiment of a wireless communication system including a distance threshold.

FIG. 5 is a schematic block diagram illustrating one embodiment of a wireless communication system 500 including a distance threshold. The wireless communication system 500 includes a geographical region 502. The wireless communication system 500 also includes a base unit 104 and a first vehicle unit 504 (e.g., remote unit 102, vehicle UE). The first vehicle unit 504 is illustrated as beginning at a first location at a first time and moving a distance 506 to be at a second location at a second time. The wireless communication system 500 also includes a second vehicle unit 508 (e.g., remote unit 102, vehicle UE) that begins at a first location at the first time and moves a distance 510 to be at a second location at the second time. As illustrated, the base unit 104 communicates via a communication channel 512 with the first vehicle unit 504 and the second vehicle unit 508.

In certain embodiments, the base unit 104 may transmit information to the first vehicle unit 504 and/or the second vehicle unit 508 that includes a moving distance threshold. In other embodiments, the first vehicle unit 504 and/or the second vehicle unit 508 may be preconfigured with a moving distance threshold. In some embodiments, the moving distance threshold may depend on a direction of the moving distance. In various embodiments, the base unit 104 may indicate to the first vehicle unit 504 and/or the second vehicle unit 508 to calculate a moving distance from a certain time (e.g., a time in which configuration information is received, a time in which configuration information begins to take effect, a time triggered by a DL PHY signaling, and so forth) and/or a certain location (e.g., a location in which configuration information is received, a location in which configuration information begins to take effect, and so forth) to a current time and/or a current location. In some embodiments, the moving distance may be associated with an effective range of a location based resource pool.

In one example, a moving distance threshold (e.g., predetermined threshold) may be 1 km and may be transmitted from the base unit 104 to the first vehicle unit 504 (or the first vehicle unit 504 may be preconfigured with the moving distance threshold). In such an example, the distance 506 moved by the first vehicle unit 504 may be based on the first location of the first vehicle unit 504 at the first time; however, in other examples, the distance 506 moved may be based on a preconfigured location or a location received from the base unit 104. After the distance 506 moved by the first vehicle unit 504 is greater than the moving distance threshold, the first vehicle unit 504 may transmit its location to the base unit 104, receive a new moving distance threshold from the base unit 104, and/or change a resource pool used.

In another example, a moving distance threshold (e.g., predetermined threshold) may be 5 km and may be transmitted from the base unit 104 to the second vehicle unit 508 (or the second vehicle unit 508 may be preconfigured with the moving distance threshold). In such an example, the distance 510 moved by the second vehicle unit 508 may be based on the first location of the second vehicle unit 508 at the first time; however, in other examples, the distance 510 moved may be based on a preconfigured location or a location received from the base unit 104. After the distance 510 moved by the second vehicle unit 508 is greater than the moving distance threshold, the second vehicle unit 508 may transmit its location to the base unit 104, receive a new moving distance threshold from the base unit 104, and/or change a resource pool used.

Figure 6:
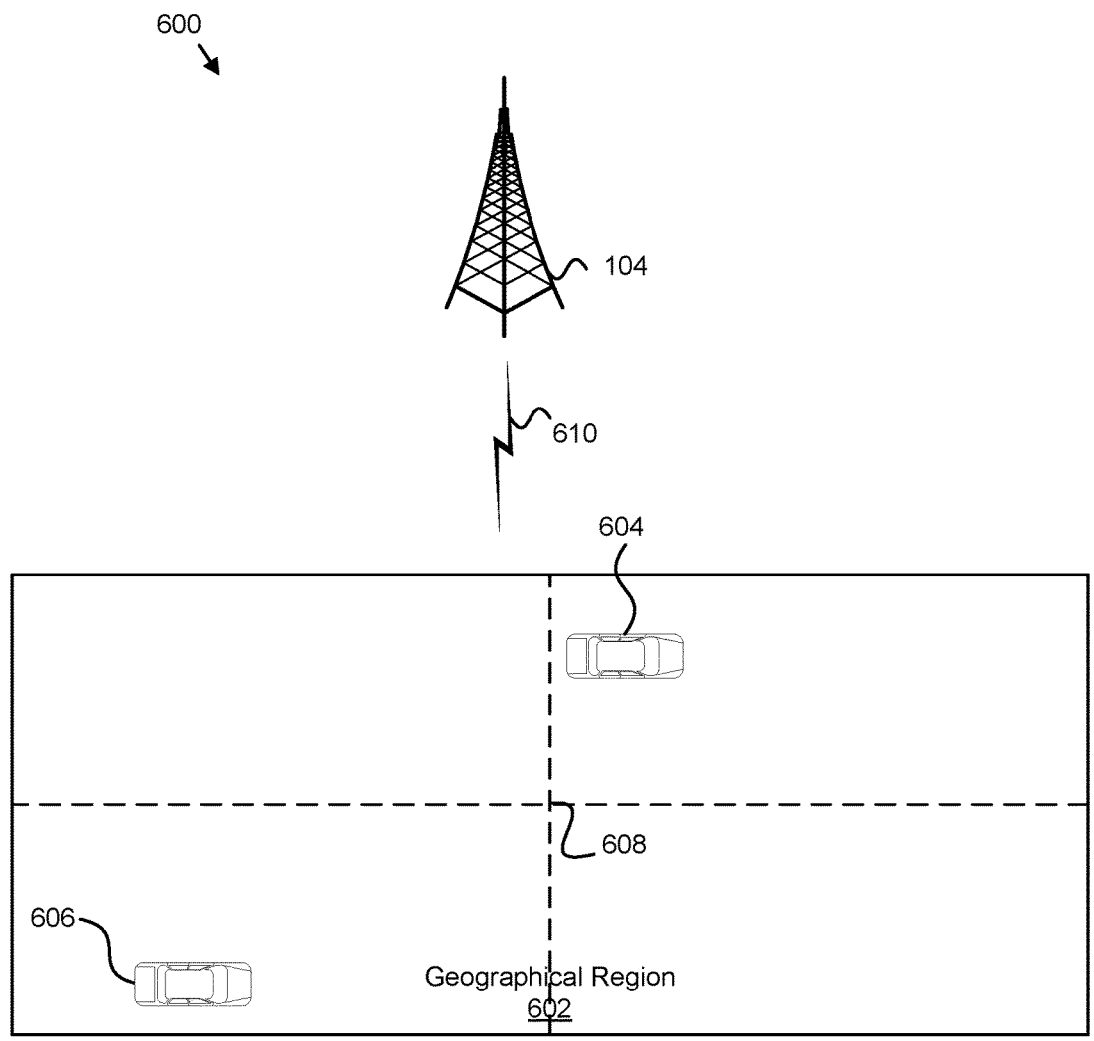
FIG. 6 is a schematic block diagram illustrating one embodiment of a wireless communication system including a reference point coordinate.

FIG. 6 is a schematic block diagram illustrating one embodiment of a wireless communication system 600 including a reference point coordinate. The wireless communication system 600 includes a geographical region 602. The wireless communication system 600 also includes a base unit 104, a first vehicle unit 604 (e.g., remote unit 102, vehicle UE), and a second vehicle unit 606 (e.g., remote unit 102, vehicle UE). Further, the geographical region 602 includes a reference point coordinate 608. As illustrated, the base unit 104 communicates via a communication channel 610 with the first vehicle unit 604 and the second vehicle unit 606.

In certain embodiments, the base unit 104 may transmit information to the first vehicle unit 604 and/or the second vehicle unit 606 that includes the reference point coordinate 608. The reference point coordinate 608 may include any type of information that identifies a reference location. For example, the reference point coordinate 608 may include one or more of a street address, a latitude, a longitude, an altitude, and so forth. The reference point coordinate 608 may, in one embodiment, be a central point of a location based resource pool, or some other point that is associated with the location based resource pool. In some embodiments, the base unit 104 may indicate to the first vehicle unit 604 and/or the second vehicle unit 606 the reference point coordinate 608. In other embodiments, the first vehicle unit 604 and/or the second vehicle unit 606 may be preconfigured with information used to determine the reference point coordinate 608.

In various embodiments, the first vehicle unit 604 and/or the second vehicle unit 606 may use the reference point coordinate 608 to determine whether it is located within the geographical region 602 having a corresponding location based resource pool. In certain embodiments, a distance between the first vehicle unit 604 and the reference point coordinate 608 may be compared to a moving distance threshold to determine whether the first vehicle unit 604 may transmit its location to the base unit 104, receive a new moving distance threshold from the base unit 104, and/or change a resource pool used. In some embodiments, a distance between the second vehicle unit 606 and the reference point coordinate 608 may be compared to a moving distance threshold to determine whether the second vehicle unit 606 may transmit its location to the base unit 104, receive a new moving distance threshold from the base unit 104, and/or change a resource pool used.

Figure 7:
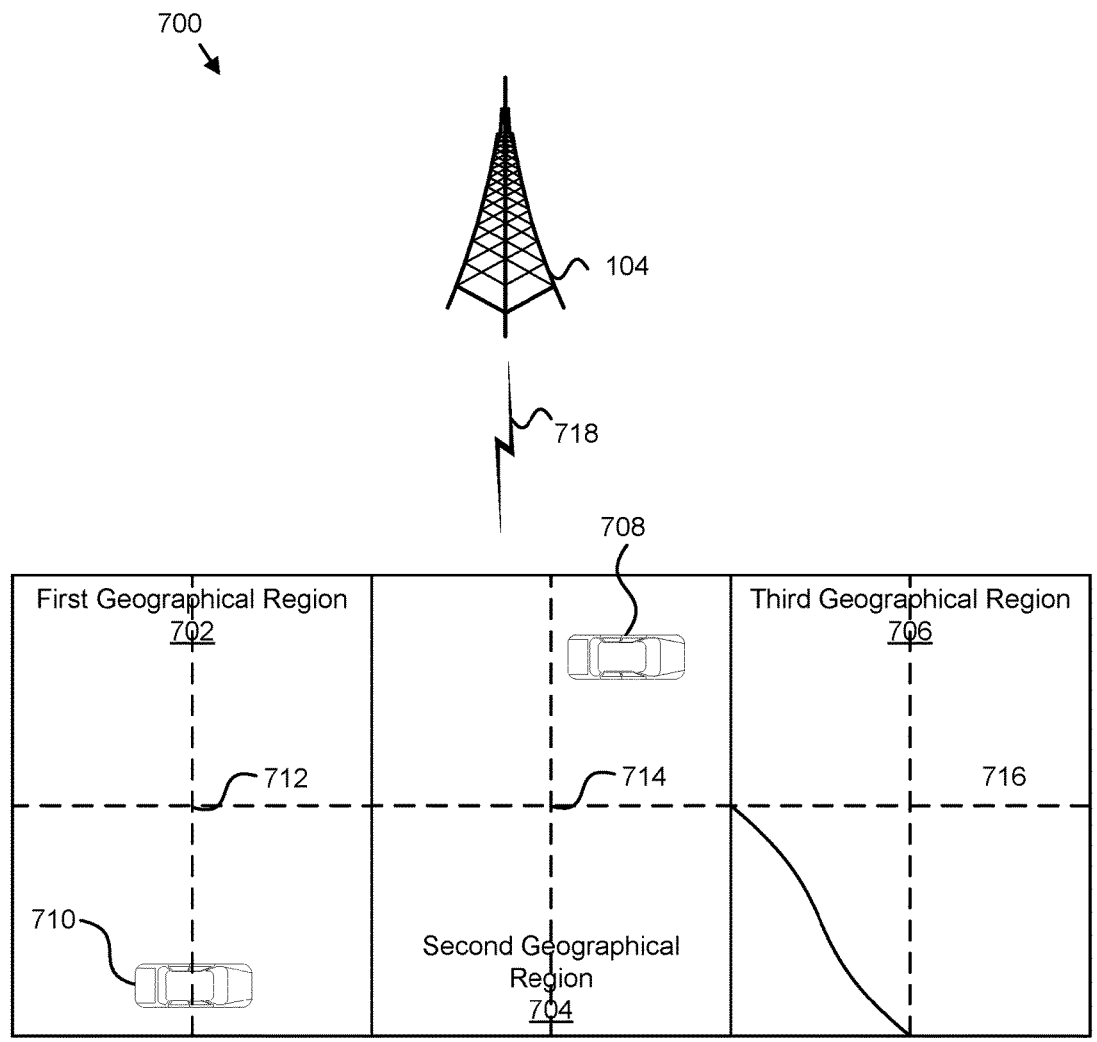
FIG. 7 is a schematic block diagram illustrating one embodiment of a wireless communication system including multiple reference point coordinates.

FIG. 7 is a schematic block diagram illustrating one embodiment of a wireless communication system 700 including multiple reference point coordinates. The wireless communication system 700 includes a first geographical region 702, a second geographical region 704, and a third geographical region 706. The wireless communication system 700 also includes a base unit 104, a first vehicle unit 708 (e.g., remote unit 102, vehicle UE), and a second vehicle unit 710 (e.g., remote unit 102, vehicle UE). Further, the first geographical region 702 includes a first reference point coordinate 712, the second geographical region 704 includes a second reference point coordinate 714, and the third geographical region 706 includes a third reference point coordinate 716. As illustrated, the base unit 104 communicates via a communication channel 718 with the first vehicle unit 708 and the second vehicle unit 710.

In certain embodiments, the base unit 104 may transmit information to the first vehicle unit 708 and/or the second vehicle unit 710 that includes the first reference point coordinate 712, the second reference point coordinate 714, and/or the third reference point coordinate 716. The first reference point coordinate 712, the second reference point coordinate 714, and the third reference point coordinate 716 may each include any type of information that identifies a reference location. For example, each of the first reference point coordinate 712, the second reference point coordinate 714, and the third reference point coordinate 716 may include one or more of a street address, a latitude, a longitude, an altitude, and so forth. Each of the first reference point coordinate 712, the second reference point coordinate 714, and the third reference point coordinate 716 may, in one embodiment, be a central point of a location based resource pool, or some other point that is associated with the location based resource pool. In some embodiments, the base unit 104 may indicate to the first vehicle unit 708 and/or the second vehicle unit 710 the first reference point coordinate 712, the second reference point coordinate 714, and/or the third reference point coordinate 716. In other embodiments, the first vehicle unit 708 and/or the second vehicle unit 710 may be preconfigured with information used to determine the first reference point coordinate 712, the second reference point coordinate 714, and/or the third reference point coordinate 716.

In various embodiments, the first vehicle unit 708 and/or the second vehicle unit 710 may use the first reference point coordinate 712, the second reference point coordinate 714, and/or the third reference point coordinate 716 to determine whether it is located within one of the first geographical region 702, the second geographical region 704, and/or the third geographical region 706, which each region having a corresponding location based resource pool. In certain embodiments, a distance between the first vehicle unit 708 and the first reference point coordinate 712, the second reference point coordinate 714, and/or the third reference point coordinate 716 may be compared to a moving distance threshold to determine whether the first vehicle unit 708 may transmit its location to the base unit 104, receive a new moving distance threshold from the base unit 104, and/or change a resource pool used. In some embodiments, a distance between the second vehicle unit 710 and the first reference point coordinate 712, the second reference point coordinate 714, and/or the third reference point coordinate 716 may be compared to a moving distance threshold to determine whether the second vehicle unit 710 may transmit its location to the base unit 104, receive a new moving distance threshold from the base unit 104, and/or change a resource pool used.

Figure 8:
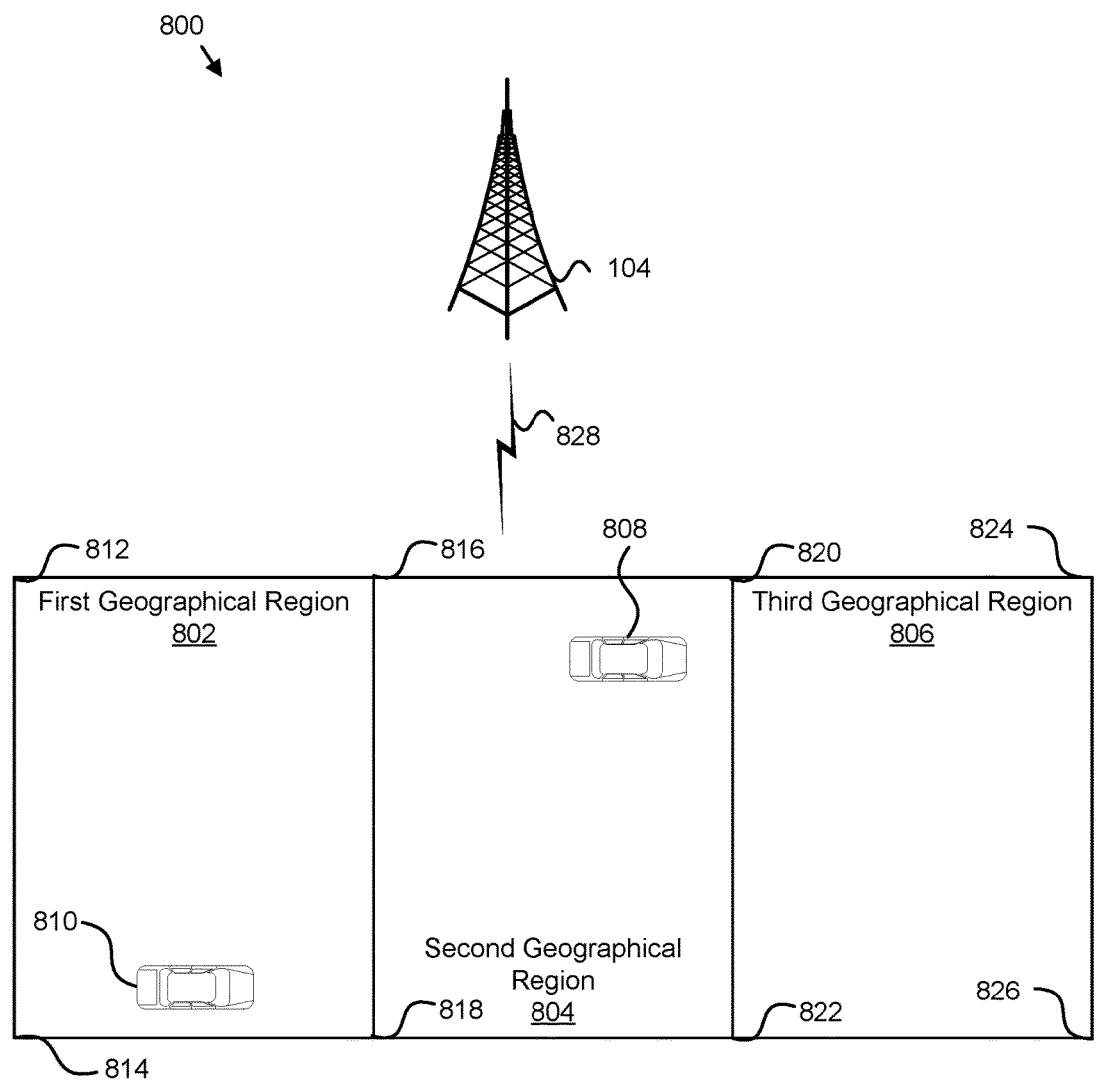
FIG. 8 is a schematic block diagram illustrating one embodiment of a wireless communication system including a geographical region definition.

FIG. 8 is a schematic block diagram illustrating one embodiment of a wireless communication system 800 including a geographical region definition. The wireless communication system 800 includes a first geographical region 802, a second geographical region 804, and a third geographical region 806. The wireless communication system 800 also includes a base unit 104, a first vehicle unit 808 (e.g., remote unit 102, vehicle UE), and a second vehicle unit 810 (e.g., remote unit 102, vehicle UE). Further, the first geographical region 802 has boundaries that are defined by reference point coordinates 812, 814, 816, and 818, the second geographical region 804 has boundaries that are defined by reference point coordinates 816, 818, 820, and 822, and the third geographical region 806 has boundaries that are defined by reference point coordinates 820, 822, 824, and 826. As illustrated, the base unit 104 communicates via a communication channel 828 with the first vehicle unit 808 and the second vehicle unit 810.

In certain embodiments, the base unit 104 may transmit information to the first vehicle unit 808 and/or the second vehicle unit 810 that includes the reference point coordinates 812, 814, 816, 818, 820, 822, 824, and 826 to define the boundaries (e.g., edges) for the first geographical region 802, the second geographical region 804, and the third geographical region 806. The reference point coordinates 812, 814, 816, 818, 820, 822, 824, and 826 may each include any type of information that identifies a reference location. For example, each of the reference point coordinates 812, 814, 816, 818, 820, 822, 824, and 826 may include one or more of a street address, a latitude, a longitude, an altitude, and so forth. Each of the reference point coordinates 812, 814, 816, 818, 820, 822, 824, and 826 may, in one embodiment, be a point associated with a boundary of one or more of the first geographical region 802, the second geographical region 804, and the third geographical region 806. In some embodiments, the base unit 104 may indicate to the first vehicle unit 808 and/or the second vehicle unit 810 one or more of the reference point coordinates 812, 814, 816, 818, 820, 822, 824, and 826. In other embodiments, the first vehicle unit 808 and/or the second vehicle unit 810 may be preconfigured with information used to determine one or more of the reference point coordinates 812, 814, 816, 818, 820, 822, 824, and 826.

In various embodiments, the first vehicle unit 808 and/or the second vehicle unit 810 may use one or more of the reference point coordinates 812, 814, 816, 818, 820, 822, 824, and 826 to determine whether it is located within one of the first geographical region 802, the second geographical region 804, and/or the third geographical region 806, which each region having a corresponding location based resource pool. In certain embodiments, whether the first vehicle unit 808 is within one of the first geographical region 802, the second geographical region 804, and/or the third geographical region 806 may determine whether the first vehicle unit 808 may transmit its location to the base unit 104, receive a new moving distance threshold from the base unit 104, and/or change a resource pool used. In some embodiments, whether the second vehicle unit 810 is within one of the first geographical region 802, the second geographical region 804, and/or the third geographical region 806 may determine whether the second vehicle unit 810 may transmit its location to the base unit 104, receive a new moving distance threshold from the base unit 104, and/or change a resource pool used.

Figure 9:
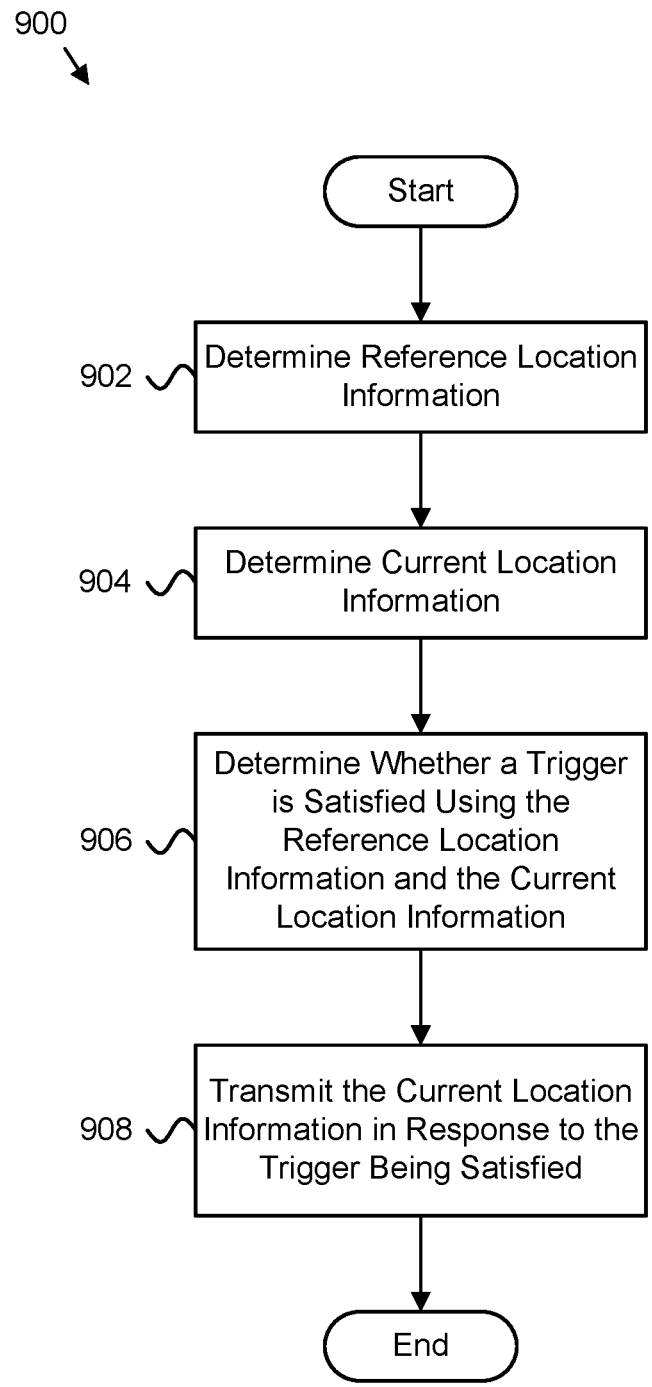
FIG. 9 is a schematic flow chart diagram illustrating one embodiment of a method for triggering transmissions using location information.

FIG. 9 is a schematic flow chart diagram illustrating one embodiment of a method 900 for triggering transmissions using location information. In some embodiments, the method 900 is performed by an apparatus, such as the remote unit 102 (e.g., vehicle). In certain embodiments, the method 900 may be performed by a processor executing program code, for example, a microcontroller, a microprocessor, a CPU, a GPU, an auxiliary processing unit, a FPGA, or the like.

The method 900 may include determining 902 reference location information. The reference location information may include information identifying a reference region, such as the first geographical region 402, the second geographical region 404, the third geographical region 406, the geographical region 502, the geographical region 602, the first geographical region 702, the second geographical region 704, the third geographical region 706, the first geographical region 802, the second geographical region 804, and/or the third geographical region 806. The method 900 may also include determining 904 current location information. The current location information may be information corresponding to any location that may be determined using one or more of a geospatial positioning system, a global navigation satellite system, a location determining system, an electronic device, a network system, a sensor (e.g., gyroscope, accelerometer, etc.), for example. In certain embodiments, the method 900 may include determining current location information may include determining a current location, a moving direction, a velocity, and so forth. The method 900 may include determining 906 whether a trigger is satisfied using the reference location information and the current location information. In certain embodiments, the trigger may be satisfied in response to movement beyond a threshold distance, movement out of a region, movement into a region, a predetermined time period, a predetermined distance moved, and so forth. The method 900 may include transmitting 908 the current location information in response to the trigger being satisfied, and the method 900 may end. The current location information may be transmitted in any suitable format and may include any suitable information used to determine the location of the remote unit 102.

In certain embodiments, the reference location information is determined using a single reference location (e.g., reference point coordinate 608), and the current location information is determined using a current location. In some embodiments, the single reference location is a last transmitted location, and the trigger is satisfied in response to a distance between the single reference location and the current location being greater than a predetermined threshold. It should be noted that a last transmitted location may be the most recent location that is transmitted from a remote unit 102 to a base unit 104. In other words, the remote unit 102 has not transmitted a location to the base unit 104 after the last transmitted location. In certain embodiments, the method 900 includes receiving information indicating the single reference location. In various embodiments, the trigger is satisfied in response to a distance between the single reference location and the current location being greater than a predetermined threshold, and a distance between the single reference location and a last transmitted location being less than the predetermined threshold.

In various embodiments, the reference location information includes a reference region determined using multiple reference locations (e.g., reference point coordinates 812, 814, 816, 818), and the current location information is determined using a current location. In one embodiment, the reference region is a concave hull or a convex hull determined using the multiple reference locations. In another embodiment, the method 900 includes receiving information indicating the multiple reference locations.

In certain embodiments, the trigger is satisfied in response to the current location being outside of the reference region, and a last transmitted location being within the reference region. For example, referring to FIG. 8, if the reference region is the first geographical region 802, the current location of the first vehicle unit 808 is outside of the reference region. If the last transmitted location was within the first geographical region 802, then the trigger is satisfied.

In various embodiments, the method 900 includes receiving information indicating one or more resource pools corresponding to the current location information; determining a resource pool from the one or more resource pools; and transmitting data using the determined resource pool. In some embodiments, the method 900 includes receiving information indicating a DMRS density; and transmitting data using the DMRS density. In one embodiment, the reference location information is determined using a last transmitted location. For example, referring to FIG. 8, if the last transmitted location of the first vehicle unit 808 indicated that the first vehicle unit 808 was within the first geographical region 802, the first geographical region 802 may correspond to the reference location information.

Figure 10:
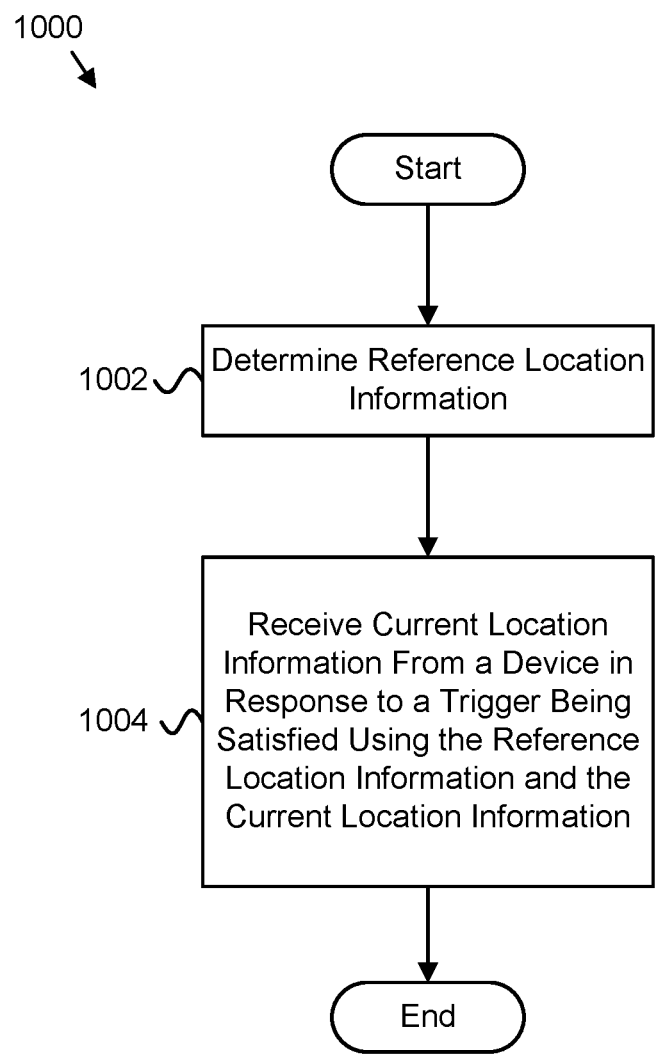
FIG. 10 is a schematic flow chart diagram illustrating one embodiment of a method for triggering transmissions using location information.

FIG. 10 is a schematic flow chart diagram illustrating one embodiment of a method 1000 for triggering transmissions using location information. In some embodiments, the method 1000 is performed by an apparatus, such as the base unit 104 (e.g., eNB). In certain embodiments, the method 1000 may be performed by a processor executing program code, for example, a microcontroller, a microprocessor, a CPU, a GPU, an auxiliary processing unit, a FPGA, or the like.

The method 1000 may include determining 1002 reference location information. The reference location information may include information identifying a reference region, such as the first geographical region 402, the second geographical region 404, the third geographical region 406, the geographical region 502, the geographical region 602, the first geographical region 702, the second geographical region 704, the third geographical region 706, the first geographical region 802, the second geographical region 804, and/or the third geographical region 806. The method 1000 may also include receiving 1004 current location information from a device in response to a trigger being satisfied using the reference location information and the current location information, and the method 1000 may end. The current location information may be information corresponding to any location that may be determined using one or more of a geospatial positioning system, a global navigation satellite system, a location determining system, an electronic device, a network system, a sensor (e.g., gyroscope, accelerometer, etc.), for example.

In certain embodiments, the reference location information is determined using a single reference location (e.g., reference point coordinate 608), and the current location information is determined using a current location. In some embodiments, the single reference location is a last received location, and the trigger is satisfied in response to a distance between the single reference location and the current location of the device being greater than a predetermined threshold. It should be noted that a last received location may be the most recent location that is received by a base unit 104 from a remote unit 102. In other words, the base unit 104 has not received a location from the remote unit 102 after the last received location. In certain embodiments, the method 1000 includes transmitting information indicating the single reference location. In various embodiments, the trigger is satisfied in response to a distance between the single reference location and the current location being greater than a predetermined threshold, and a distance between the single reference location and a last received location from the device being less than the predetermined threshold.

In various embodiments, the reference location information includes a reference region determined using multiple reference locations (e.g., reference point coordinates 812, 814, 816, 818), and the current location information is determined using a current location. In one embodiment, the reference region is a concave hull or a convex hull determined using the multiple reference locations. In another embodiment, the method 1000 includes transmitting information indicating the multiple reference locations.

In certain embodiments, the trigger is satisfied in response to the current location of the device being outside of the reference region, and a last received location from the device being within the reference region. For example, referring to FIG. 8, if the reference region is the first geographical region 802, the current location of the first vehicle unit 808 is outside of the reference region. If the last received location was within the first geographical region 802, then the trigger is satisfied.

In various embodiments, the method 1000 includes determining one or more resource pools for the device to use, the one or more resource pools corresponding to the current location information of the device; and the transmitter transmits information indicating the one or more resource pools to the device. In some embodiments, the method 1000 includes determining a DMRS density for the device to use based on the location information of the device; and transmitting information indicating the DMRS density to the device. In one embodiment, the reference location information is determined using a last received location. For example, referring to FIG. 8, if the last received location of the first vehicle unit 808 indicated that the first vehicle unit 808 was within the first geographical region 802, the first geographical region 802 may correspond to the reference location information.

It should be noted that location information as used herein may include one or more of a geographical location, a velocity, and a moving direction.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor that:
        determines reference location information;
        determines current location information; and
        determines whether a trigger is satisfied using the reference location information and the current location information of the apparatus, wherein the apparatus is a user equipment;
    a transmitter that transmits the current location information of the user equipment in response to the trigger being satisfied to reduce resources used to transmit the current location information; and
    a receiver that receives information from a network device notifying the user equipment of one or more resource pools to use in response to transmitting the current location information, wherein the one or more resource pools are based on the current location information of the user equipment.

2. The apparatus of claim 1, wherein the reference location information is determined using a single reference location, and the current location information is determined using a current location.

3. The apparatus of claim 2, wherein the single reference location is a last transmitted location, and the trigger is satisfied in response to a distance between the single reference location and the current location being greater than a predetermined threshold.

4. The apparatus of claim 2, further comprising a receiver that receives information indicating the single reference location.

5. The apparatus of claim 2, wherein the trigger is satisfied in response to a distance between the single reference location and the current location being greater than a predetermined threshold, and a distance between the single reference location and a last transmitted location being less than the predetermined threshold.

6. The apparatus of claim 1, wherein the reference location information comprises a reference region determined using a plurality of reference locations, and the current location information is determined using a current location.

7. The apparatus of claim 6, wherein the reference region is a concave hull or a convex hull determined using the plurality of reference locations.

8. The apparatus of claim 6, further comprising a receiver that receives information indicating the plurality of reference locations.

9. The apparatus of claim 6, wherein the trigger is satisfied in response to the current location being outside of the reference region, and a last transmitted location being within the reference region.

10. The apparatus of claim 1, wherein the processor determines a resource pool from the one or more resource pools, and the transmitter transmits data using the determined resource pool.

11. The apparatus of claim 1, further comprising a receiver that receives information indicating a DMRS density, wherein the transmitter transmits data using the DMRS density.

12. The apparatus of claim 1, wherein the reference location information is determined using a last transmitted location.

13. A method comprising:
  determining, at a user equipment, reference location information;
  determining current location information of the user equipment;
  determining whether a trigger is satisfied using the reference location information and the current location information of the user equipment;
  transmitting the current location information of the user equipment in response to the trigger being satisfied to reduce resources used to transmit the current location information; and
  receiving information notifying the user equipment of one or more resource pools to use in response to transmitting the current location information, wherein the one or more resource pools are based on the current location information of the user equipment.

14. The method of claim 13, wherein the reference location information is determined using a single reference location, and the current location information is determined using a current location.

15. The method of claim 14, wherein the single reference location is a last transmitted location, and the trigger is satisfied in response to a distance between the single reference location and the current location being greater than a predetermined threshold.

16. The method of claim 14, further comprising receiving information indicating the single reference location.

17. The method of claim 14, wherein the trigger is satisfied in response to a distance between the single reference location and the current location being greater than a predetermined threshold, and a distance between the single reference location and a last transmitted location being less than the predetermined threshold.

18. The method of claim 13, wherein the reference location information comprises a reference region determined using a plurality of reference locations, and the current location information is determined using a current location.

19. The method of claim 18, wherein the reference region is a concave hull or a convex hull determined using the plurality of reference locations.

20. The method of claim 18, further comprising receiving information indicating the plurality of reference locations.

21. The method of claim 18, wherein the trigger is satisfied in response to the current location being outside of the reference region, and a last transmitted location being within the reference region.

22. The method of claim 13, further comprising:
  determining a resource pool from the one or more resource pools; and
  transmitting data using the determined resource pool.

23. The method of claim 13, further comprising:
  receiving information indicating a DMRS density; and
  transmitting data using the DMRS density.

24. The method of claim 13, wherein the reference location information is determined using a last transmitted location.

25. An apparatus comprising:
  a processor that determines reference location information;
  a receiver that receives current location information of a user equipment from the user equipment in response to a trigger being satisfied using the reference location information and the current location information, wherein the current location information is received from the user equipment in response to the trigger being satisfied to reduce resources used by the user equipment to transmit the current location information; and
  a transmitter that transmits to the user equipment information notifying the user equipment of one or more resource pools to use in response to receiving the current location information of the user equipment, wherein the one or more resource pools are based on the current location information of the user equipment.

26. The apparatus of claim 25, wherein the reference location information is determined using a single reference location, and the current location information is determined using a current location.

27. The apparatus of claim 26, wherein the single reference location is a last received location from the user equipment, and the trigger is satisfied in response to a distance between the single reference location and the current location of the user equipment being greater than a predetermined threshold.

28. The apparatus of claim 26, further comprising a transmitter that transmits information indicating the single reference location.

29. The apparatus of claim 26, wherein the trigger is satisfied in response to a distance between the single reference location and the current location being greater than a predetermined threshold, and a distance between the single reference location and a last received location from the user equipment being less than the predetermined threshold.

30. The apparatus of claim 25, wherein the reference location information comprises a reference region determined using a plurality of reference locations, and the current location information is determined using a current location.

31. The apparatus of claim 30, wherein the reference region is a concave hull or a convex hull determined using the plurality of reference locations.

32. The apparatus of claim 30, further comprising a transmitter that transmits information indicating the plurality of reference locations.

33. The apparatus of claim 30, wherein the trigger is satisfied in response to the current location of the user equipment being outside of the reference region, and a last received location from the user equipment being within the reference region.

34. The apparatus of claim 25, wherein the processor determines the one or more resource pools for the user equipment to use.

35. The apparatus of claim 25, further comprising a transmitter, wherein:
  the processor determines a DMRS density for the user equipment to use based on the current location information of the user equipment; and
  the transmitter transmits information indicating the DMRS density to the user equipment.

36. The apparatus of claim 25, wherein the reference location information is determined using a last received location of the user equipment.

37. A method comprising:

determining reference location information;

receiving, at a network device, current location information of a user equipment from the user equipment in response to a trigger being satisfied using the reference location information and the current location information, wherein the current location information is received from the user equipment in response to the trigger being satisfied to reduce resources used by the user equipment to transmit the current location information; and transmitting to the user equipment information notifying the user equipment of one or more resource pools to use in response to receiving the current location information of the user equipment, wherein the one or more resource pools are based on the current location information of the user equipment.

38. The method of claim 37, wherein the reference location information is determined using a single reference location, and the current location information is determined using a current location.

39. The method of claim 38, wherein the single reference location is a last received location from the user equipment, and the trigger is satisfied in response to a distance between the single reference location and the current location of the user equipment being greater than a predetermined threshold.

40. The method of claim 38, further comprising transmitting information indicating the single reference location.

41. The method of claim 38, wherein the trigger is satisfied in response to a distance between the single reference location and the current location being greater than a predetermined threshold, and a distance between the single reference location and a last received location from the user equipment being less than the predetermined threshold.

42. The method of claim 37, wherein the reference location information comprises a reference region determined using a plurality of reference locations, and the current location information is determined using a current location.

43. The method of claim 42, wherein the reference region is a concave hull or a convex hull determined using the plurality of reference locations.

44. The method of claim 42, further comprising transmitting information indicating the plurality of reference locations.

45. The method of claim 42, wherein the trigger is satisfied in response to the current location of the user equipment being outside of the reference region, and a last received location from the user equipment being within the reference region.

46. The method of claim 37, further comprising determining the one or more resource pools for the user equipment to use.

47. The method of claim 37, further comprising:

determining a DMRS density for the user equipment to use based on the current location information of the user equipment; and transmitting information indicating the DMRS density to the user equipment.

48. The method of claim 37, wherein the reference location information is determined using a last received location of the user equipment.

* * * * *